United States Patent
Kondo et al.

(10) Patent No.: US 6,728,813 B1
(45) Date of Patent: Apr. 27, 2004

(54) METHOD AND APPARATUS FOR CONVERTING NON-BURST WRITE CYCLES TO BURST WRITE CYCLES ACROSS A BUS BRIDGE

(75) Inventors: Nobukazu Kondo, Ebina (JP); Tomohisa Kohiyama, Yokohama (JP); Koki Noguchi, Setagaya-ku (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/250,156

(22) Filed: Feb. 16, 1999

(30) Foreign Application Priority Data

Feb. 17, 1998 (JP) .............................. 10-034541

(51) Int. Cl.$^7$ ............................................. G06F 13/14
(52) U.S. Cl. ........................................ 710/305; 710/35
(58) Field of Search .............................. 710/305, 33–35

(56) References Cited

U.S. PATENT DOCUMENTS

| | | | | |
|---|---|---|---|---|
| 5,146,582 A | * | 9/1992 | Begun ......................... 712/229 |
| 5,276,684 A | * | 1/1994 | Pearson ....................... 370/438 |
| 5,564,026 A | * | 10/1996 | Amini et al. ................. 710/315 |
| 5,708,814 A | * | 1/1998 | Short et al. .................. 710/260 |
| 5,732,406 A | * | 3/1998 | Bassett et al. ............... 711/104 |
| 5,805,928 A | * | 9/1998 | Lee ............................... 710/35 |
| 5,897,667 A | * | 4/1999 | Miller et al. ................. 711/218 |
| 5,943,479 A | * | 8/1999 | Klein et al. .................. 709/212 |
| 5,983,275 A | * | 11/1999 | Ecclesine .................... 709/231 |
| 6,009,493 A | * | 12/1999 | Fujiyama ........................ 711/1 |

FOREIGN PATENT DOCUMENTS

JP 5324544 7/1993

\* cited by examiner

*Primary Examiner*—Sumati Lefkowitz
(74) *Attorney, Agent, or Firm*—Antonelli, Terry, Stout & Kraus, LLP (57) ABSTRACT

For improving data efficiency of a bus in a system using address/data multiplex bus, in a processor for information processing equipment, there are provided buffers which store plural sets of write addresses and data for a system bus, a comparator for deciding whether write addresses in succession forming a continuous write address exist in the write addresses stored in the buffers, and apparatus for converting access corresponding to writing operations for the continuous write addresses into a fixed length burst transfer protocol which can be transferred with a series of continuing data cycles following one address cycle, when the comparator 27 decides that write addresses in succession exist.

15 Claims, 8 Drawing Sheets

METHOD AND APPARATUS FOR CONVERTING NON-BURST WRITE CYCLES TO BURST WRITE CYCLES ACROSS A BUS BRIDGE

BACKGROUND OF THE INVENTION

1. Field of the Invention

The present invention relates to an information processing equipment, such as a personal computer, a work station, and so on. And, it relates to a processor and a control method thereof, including a bus in a system thereof, wherein a bus, in particular, a multiplex bus in which addresses and data are used in time-sharing, supports a burst transfer protocol for enabling transfer of a plurality of write operations onto the addresses being in succession, with a series of continuing data cycles following one address cycle.

2. Description of the Prior Art

In Japanese Patent Laying-Open No. Hei 5-324544 (1993), there is disclosed a technology relating to a computer apparatus having a bus in the system thereof, wherein the bus, being the multiplex bus in which addresses and data are used in time-sharing, supports a burst transfer protocol for enabling the transfer of the plural write operations onto the addresses being in succession with the series of continuing data cycles following one address cycle.

In the conventional technology relating bus systems, in particular, among various standard bus systems, so-called address/data multiplex buses come to be commonly used, upon a requirement of reducing the number of the pins on an interface LSI, in which the address and data are used in the time-sharing manner. And, among such the address/data multiplex buses, for the purpose of improving data efficiency on the bus, many of those buses come to support the burst transfer protocol enabling the transfer of the plural write operations into the continuing addresses in succession with the series of continuing data cycles following one address cycle.

Figure 3A:
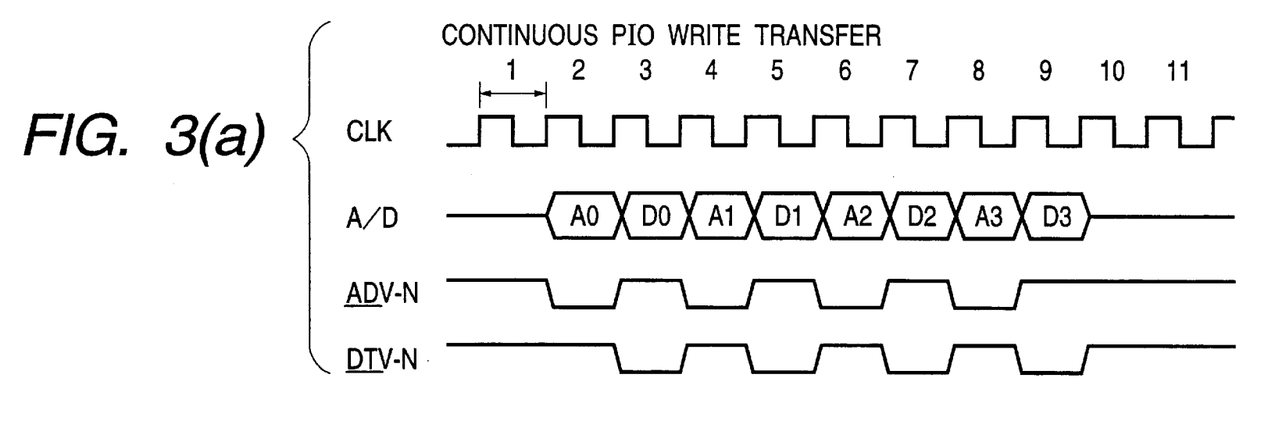
FIGS. 3a, 3b shows timing charts for showing two transfer methods on the system bus according to the present invention.
Figure 3B:
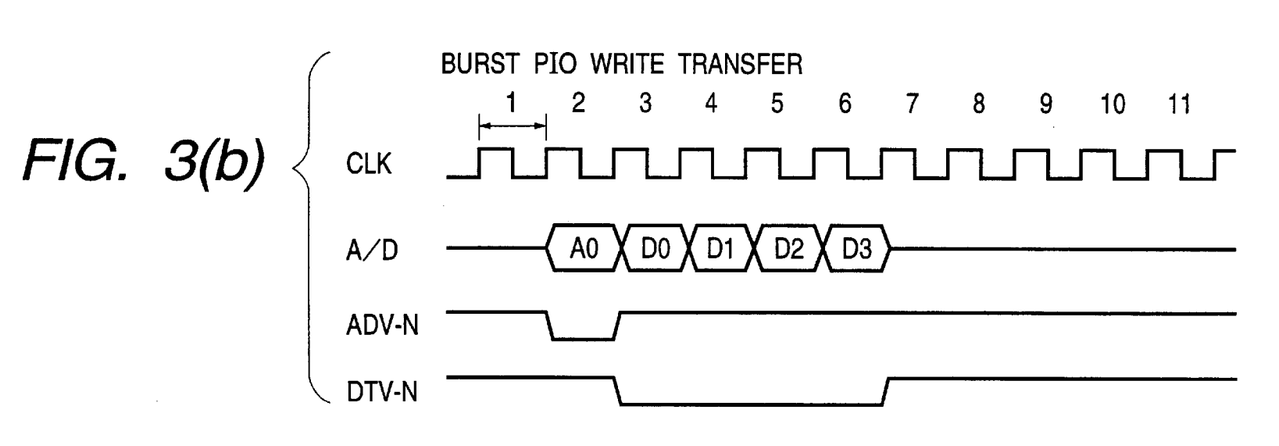

In FIG. 3, in particular, FIG. 3 (a) shows a timing chart for a continuous PIO write transfer, in which, when a single PIO write access (i.e., an access from a processor to an input/output device (IO)) appears four (4) times on the system bus in succession, they are transferred with attaching access addresses to them respectively, and in particular, FIG. 3 (b) shows the timing chart of a burst PIO write transfer access, in which accesses are converted into a burst of four (4) data cycles to be transferred onto the continuing addresses.

In the case of transferring the same continuing four (4) data ($D_0$–$D_3$), although it takes eight (8) clocks by the continuous PIO write transfer method shown in FIG. 3 (a), however, it is possible to transfer them with only five (5) clocks by means of the burst PIO write transfer method shown in FIG. 3 (b). It is appear that the efficiency on data transfer can be improved higher with use of the burst PIO write transfer method.

In the information processing equipment having such the address/data multiplex bus as the system bus thereof, supporting the burst transfer protocol mentioned above, though a module(s) being directly connected to the system bus can issue a plurality of accesses for the continuing addresses with the burst protocol, by supporting the burst protocol, however, with the transfer requirement, being transmitted through a bus converter from a bus of an other hierarchy, for example, a PIO access which is accessed to the system bus through the bus converter from an other processor, it must be issued to the system bus as the single transfer, into which the address cycle is inserted every time even if it is the transfer to the continuous addresses, thereby bringing about a drawback that the data efficiency on the bus is decreased down.

SUMMARY OF THE INVENTION

An object of the present invention, accordingly, is to provide a, processor for an information processing equipment and a control method thereof, in which the transfer requirement, being converted to be addressed through the bus converter from the bus of an other hierarchy, such as the PIO access which is accessed to the system bus through the bus converter from an other processor, is issued after being converted into the burst protocol transfer onto the system bus, if it is the transfer for the addresses in succession, thereby preventing from decrease in the data efficiency.

According to the present invention, for achieving the object mentioned in the above, there is provided a system, wherein are provided, a buffer being able to store plural sets of write addresses and data for a system bus; a comparator for deciding whether there are write accesses coming before and after about the time and being continuous in the write addresses thereof, which are stored in said buffer and; means for converting respective writing operations onto the continuing addresses into burst transfer protocol which can be transferred with a series of continuous data cycles following one address cycle, when the comparator, as a result of deciding, finds the ones coming before and after about the time and being continuous in the write addresses thereof.

With such the construction as mentioned in the above, the transfer requirement, being converted to be addressed through the bus converter from the bus of the other hierarchy, such as the PIO access which is accessed to the system bus through the bus converter from the other processor, can be issued after being converted into the burst protocol to be transfered, if it is the transfer for the addresses in successions, thereby bringing about increase in the data efficiency on the system bus and in performance of the system as a whole.

DETAILED DESCRIPTION OF PREFERRED EMBODIMENTS

Hereinafter, embodiments according to the present invention will be fully explained by referring to the attached drawings 1 through 8.

Figure 1:
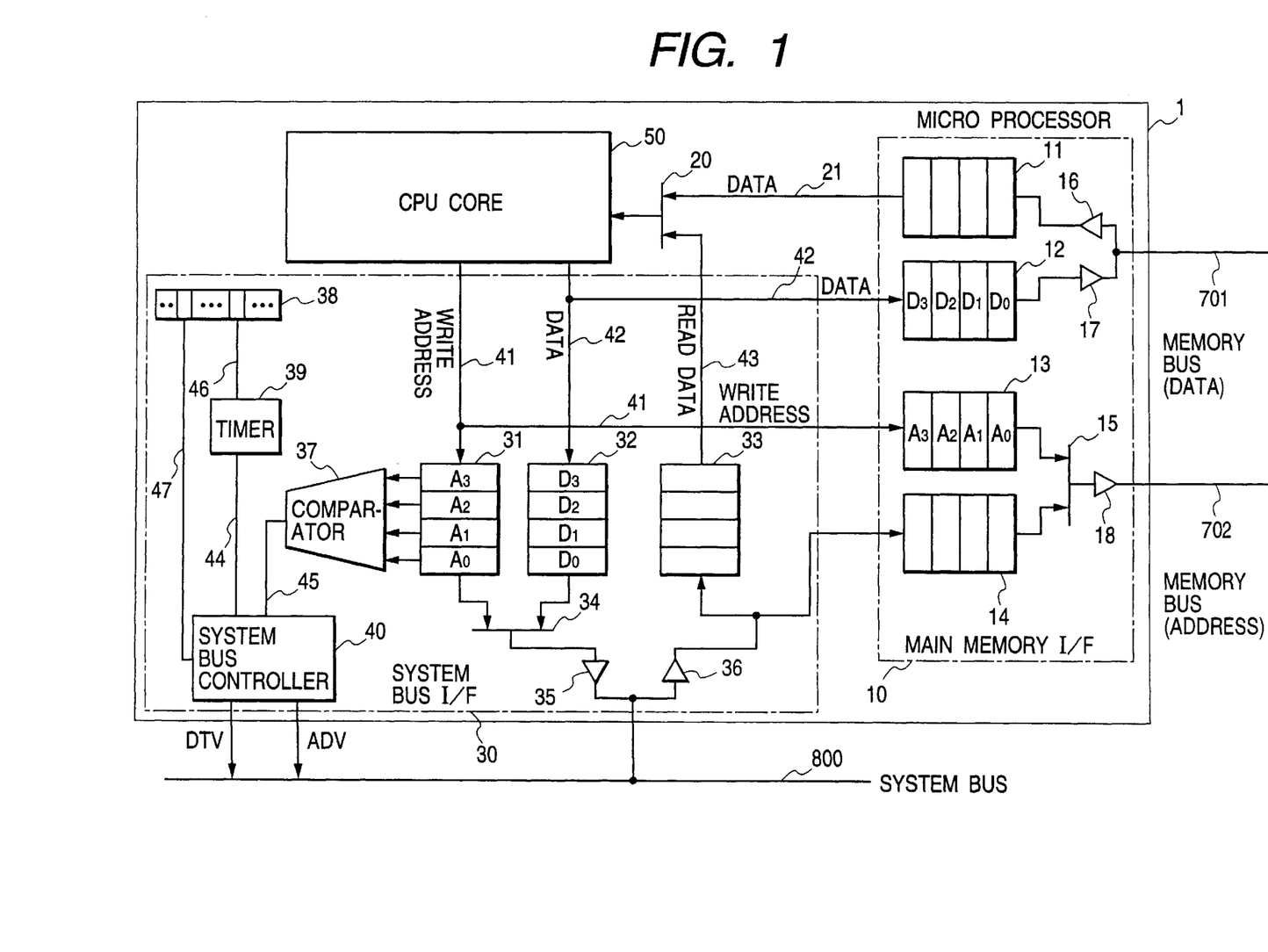
FIG. 1 is a block diagram for showing details of the interior construction of a micro-processor according to a first embodiment of the present invention.

As is shown in FIG. 1, a micro-processor 1 having two systems of bus,interfaces, i.e., a main memory bus (memory bus) and a system bus (I/O bus) according to the present invention, is constructed with a main memory bus interface 10, a system bus interface 30, and a CPU core portion 50 for executing various calculating processes.

The main memory bus interface 10 has a data buffer 11 for main memory read access, a data buffer 12 for main memory write access, an address buffer 13 for main memory access, an address buffer 14 for the direct memory access (DMA), a selector 15, an input buffer 16, and output buffers 17 and 18.

The data buffer 11 for main memory read access functions as a data buffer being able to store a plurality of sets of data which are sent from the main memory through a memory bus (data) 701.

The data buffer 12 for main memory write access functions as a data buffer being able to store a plurality of sets of data which are sent to the main memory through the memory bus (data) 701.

The address buffer 13 for main memory access functions as an access address buffer being able to store a plurality of sets of access addresses which are sent to the main memory through a memory bus (address) 702.

The address buffer 14 for direct memory access (DMA) functions as the access address buffer being able to store a plurality of sets of access addresses which are sent from a system bus to the main memory through the memory bus (address) 702.

The system bus interface 30 has an address buffer 31 for PIO access, a data buffer 32 for PIO write access, a data buffer 33 for PIO read access, a selector 34, an output buffer 35, an input buffer 36, an address comparator 37, a built-in control register 38, a timer 39, a system bus controller 40, a PIO access address and main memory access address line 41, a PIO and main memory write access data line 42, a PIO read data line 43, and control lines 44, 45, 46 and 47.

The address buffer 31 for PIO access functions as a write address buffer being able to store a plurality of sets of write addresses to the system bus 800.

The data buffer 32 for PIO write access functions as a write data buffer being able to store a plurality of sets of write data to the system bus 800.

The data buffer 33 for PIO read access has a function as a read data buffer being able to store a plurality of sets of read data from the system bus 800.

The address comparator 37 has a function for deciding whether the access requirements coming on the heels of the other or before and after about the time have the continuous write addresses coming before and after about the time, among the access requirements which are stored in the address buffer 31 for PIO access, i.e., it decides whether the PIO addresses coming before and after about the time are those for the continuing addresses or not.

The built-in control register 38 sets up a counting time period for the timer 39 with the setup value thereof.

The timer 39 counts the distance between the PIO addresses coming before and after about the time so as to set up a boundary time period for keeping the issuance of the burst transfer onto the system but 800.

The system bus controller 40 has a function for converting a plurality of writing operations onto the continuing, addresses into a burst transfer protocol by which they can be transfer with a series of the continuous data cycles following one (1) address cycle, when detecting them coming before and after about the time to have the continuing write addresses in the access requirements which are stored in the buffer 31, by controlling the system bus accesses.

Further, the micro-processor 1 has a selector 20 and a main memory read data line 21.

The micro-processor 1 having the two (2) bus interfaces, i.e., the main memory bus (memory bus) and the system bus (I/O bus;) according to the present invention, is connected to the data line 701 of the main memory bus (memory bus) through the main memory bus interface 10, and to the address line 702 of the main memory bus (memory bus), thereby being connected to the system bus (I/O bus) 800 through the system bus interface 30.

The main memory read data line 21 transfers the main memory read data from the data buffer 11 for main memory read access through the selector 20 to the CPU core portion 50.

The PIO access address and main memory access address line 41 transfers the access address from the CPU core portion 50 to the address buffer 31 for PIO access and the address buffer 13 for main memory access.

The PIO and main memory write access data line 42 transfers the access address from the CPU core portion 50 to the data buffer 32 for PIO write access and the data buffer 12 for main memory write access.

The PIO read data line 43 transfers the PIO read data from the data buffer 33 for PIO read access through the selector 20 to the CPU core portion 50.

The control line 44 transfers a control signal from the timer 39 to the system bus controller 40.

The control line 45 transfers a control signal from the address comparator 37 to the system bus controller 40.

The control line 46 transfers a control signal from the built-in control register 38 to the timer 39.

The control line 47 transfers the control signal between the built-in control register 38 and the system bus controller 40.

The output of the address buffer 13 for main memory access and the output of the address buffer 14 for direct memory access (DMA) are outputted through the selector 15 and the output buffer 18 to the memory bus address line 702.

The output of the address buffer 12 for main memory access is outputted through the output buffer 17 to the memory bus data line 701.

From the memory data line 701 is inputted the main memory data through the input buffer 16 into the data buffer 11 for main memory read access.

The output of the address buffer 31 for PIO access is outputted to the address comparator 37.

The output of the address buffer 31 for PIO access and the output of the data buffer 32 for PIO write access are outputted through the selector 34 and the output buffer 35 to the system bus (I/O bus) 800.

From the system bus (I/O bus) 800, the data for PIO read access is inputted through the input buffer 36 into the data buffer 33 for PIO read access and the address buffer 14 for direct memory access (DMA).

Figure 2:
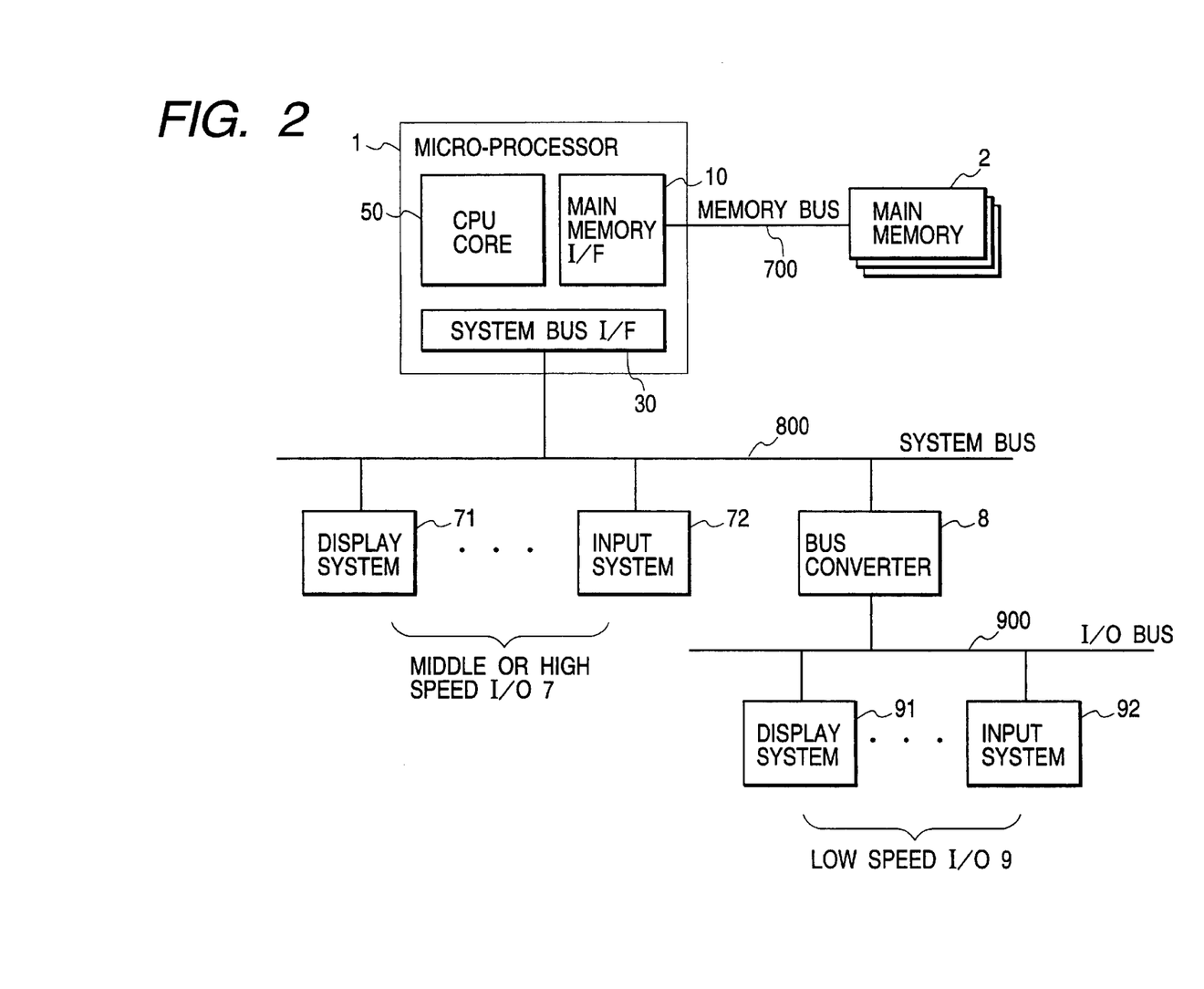
FIG. 2 is a system construction view for showing an outline of the data transfer system according to the first embodiment of the present invention.

As shown in FIG. 2, the data transfer system according to the present invention is constructed with the micro-processor 1, the main memory 2, a high or middle speed IO (input/output) device 7, such as a display system, etc., the bus converter for executing the protocol conversion between the system bus and the I/O bus, a low speed IO device 9, the main memory (memory) bus 700, the system bus, and the I/O bus 900.

The micro-processor 1 has the main memory bus interface 10, the system bus interface 30, and the CPU core portion 50.

As the high or middle speed IO (input/output) device 7, there are provided the display devices 71 and 72, and so on. As the low speed IO device 9, there are provided the display device 91 and an input device 92.

First, in FIG. 1, a case is considered where the PIO write accesses are executed continuously. The IO write addresses from the CPU core portion 50 are stored through an internal address line 41 into the buffer 31. The PIO write data from the CPU core portion 50 are stored through an other internal address line 41 into the buffer 32.

Ordinarily, the operating frequency within inside of the processor 1 is higher than that of the system bus 800, therefore, if there are given the PIO write access requirements with continuity, the next PIO write access is stored into the buffers 31 and 32 before the timing of initiating the system bus 800.

Next, those continuous two addresses of the PIO write accesses are compared by the address comparator 37. If they are continuous in the addresses thereof, the system bus controller 40 executes such the control of converting them into the burst transfer to be transferred onto the system bus.

Further, the longer in the length of the burst transfer, the higher in the data efficiency, therefore a consideration is taken to keep the transfer onto the system bus for a short time. Namely, the timer 39 is one which counts the number of the waiting cycles for that purpose.

This value is determined depending upon a ratio between the operating frequency inside the processor 1 and that of system bus 800. If it is necessary to determine whether there is the next data or not before the completion of the address cycle due to the regulation of the protocol of the system bus, it is possible to keep it for three (3) cycles with the clock (CPUCLK) of the processor, when the ratio of the operating frequency between the inside of processor and the system bus is 2:1, and it is also possible to keep it for seven (7) cycles with the clock (CPUCLK) of the processor, when the ratio of the operating frequency between the inside of processor and the system bus is 4:1.

In FIG. 3, in particular, FIG. 3 (a) shows the timing chart in the case where the single PIO write access is continued by four (4) times on the system bus, and FIG. 3 (b) shows the timing chart of the burst PIO write access of the four (4) data cycles for the continuing addresses.

In the case of the continuous PIO write transfer method, the system bus controller 40 outputs ADV-N and DTV-N, alternatively, and the write addresses $A_0$–$A_4$ and the write data $D_0$–$D_4$ are sent out to the system bus 800, alternatively.

In the burst PIO write transfer method, the system bus controller 40 outputs the burst-like DTV-N after outputting the ADV-N, and the write data $D_0$–$D_4$ having continuous addresses are sent out in the burst-like manner to the system bus 800 after the write address $A_0$.

Figure 4:
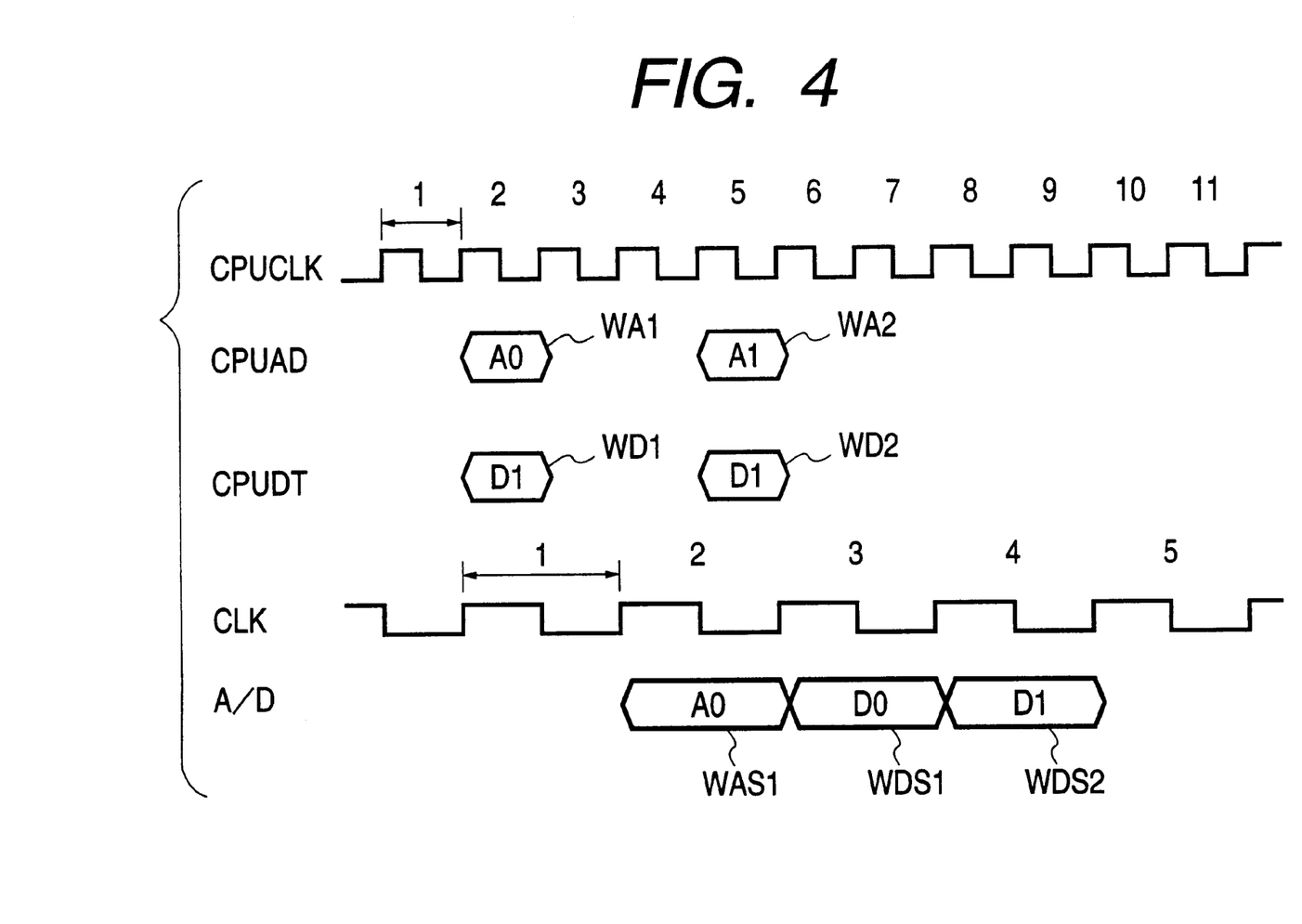
FIG. 4 shows timing charts for showing transfer timing of data in the system, being synchronized with an internal clock (CPUCLK) of the micro-processor and a clock (CLK) of the system bus, according to the first embodiment of the present invention.

In FIG. 4 showing the transfer timing within the system, in synchronism with the internal clock (CPUCLK) of the micro-processor and the clock (CLK) of the system bus, according to the first embodiment of the present invention, the CPUCLK indicates the internal clock inside the micro-processor, the CPUAD the address data inside the micro-processor, the CPUDT the data inside the micro-processor, the CLK the clock on the system bus, and the A/D the address data and the access data on the system bus, respectively.

A first PIO write access address WA1 inside the micro-processor 1 and a first PIO write access data WD1 inside the micro-processor 1 are outputted with the CPU clock 2. A second PIO write access address WA2 inside the micro-processor 1 and a second PIO write access data WD2 inside the micro-processor 1 are outputted with the CPU clock 5.

The first PIO write access address WAS1 on the system bus 800 is transferred onto the system bus 800 at the system bus clock 2, and the first PIO write access data WAD1 on the system bus is transferred with the system bus clock 3, and further the second PIO write access data WAD2 on the system bus 800 is transferred with the system bus clock 4, onto the system bus 800.

In this embodiment, the ratio between the operating frequency (CPUCLK) of the micro-processor 1 and the operating frequency (CLK) of the system bus 800 is set at 2:1.

Figure 5:
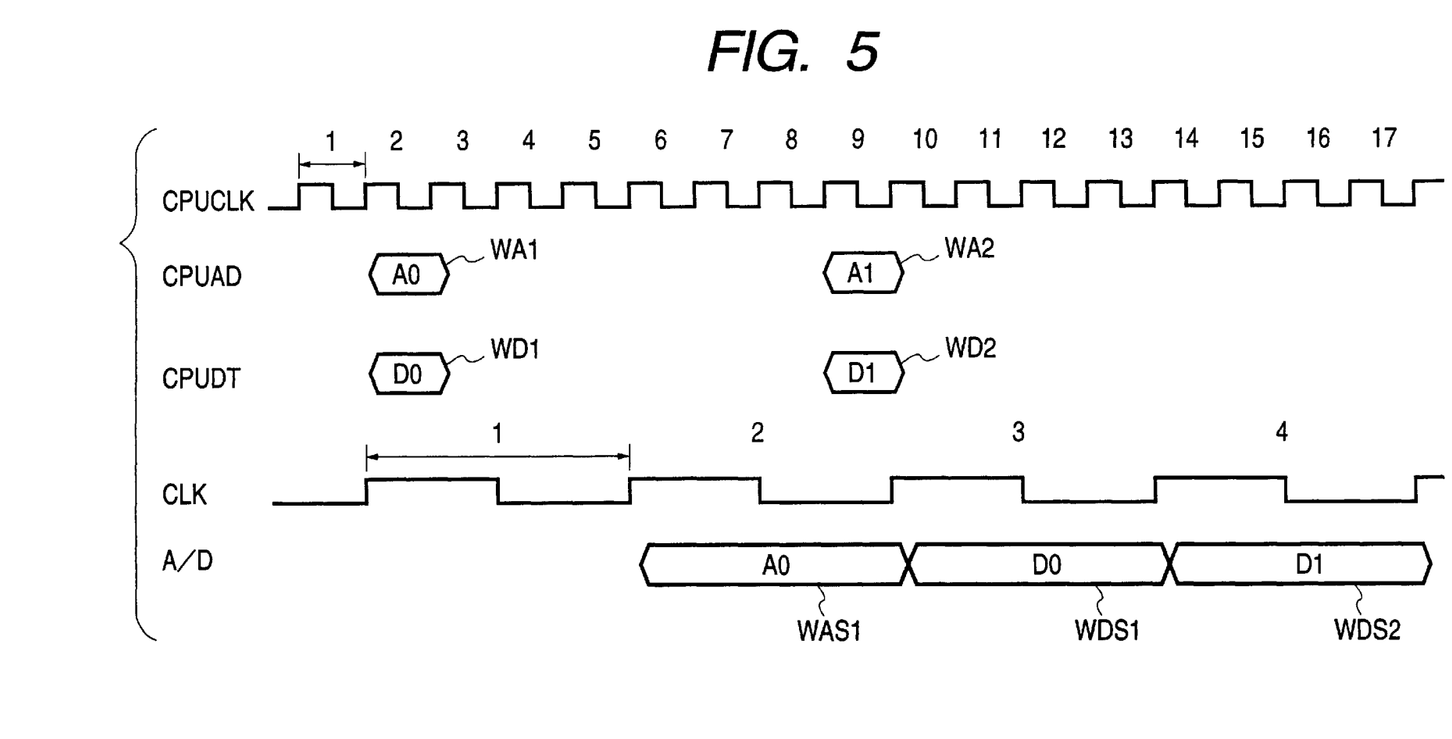
FIG. 5 also shows timing charts for showing transfer timing of data in the system, being synchronized with internal clock (CPUCLK) of the micro-processor and a clock of the system bus (CLK), according to the first embodiment of the present invention.

In FIG. 5, the first PIO write access address WA1 inside the micro-processor 1 and the first PIO write access data WD1 inside the micro-processor 1 are outputted with the CPU clock 2, and the second PIO write access address WA2 inside the micro-processor 1 and the second PIO write access data WD2 inside the micro-processor 1 are outputted with the CPU clock 9.

The first PIO write access address WAS1 on the system bus 12 is transferred with the system bus clock 2, the first PIO write access data WDS1 on the system bus 12 is with the system bus clock 3, and further the second PIO write access data WDS2 on the system bus 12 with the system bus clock 4, onto the system bus 800.

In this embodiment, the ratio between the operating frequency (CPUCLK) of the micro-processor 1 and the operating frequency (CLK) of the system bus 12 is set at 4:1.

With referring to FIG. 6, an explanation will be given on a decision process whether the single PIO access or the burst PIO access should be made in the address comparator 37 and the system bus controller 45.

Figure 6:
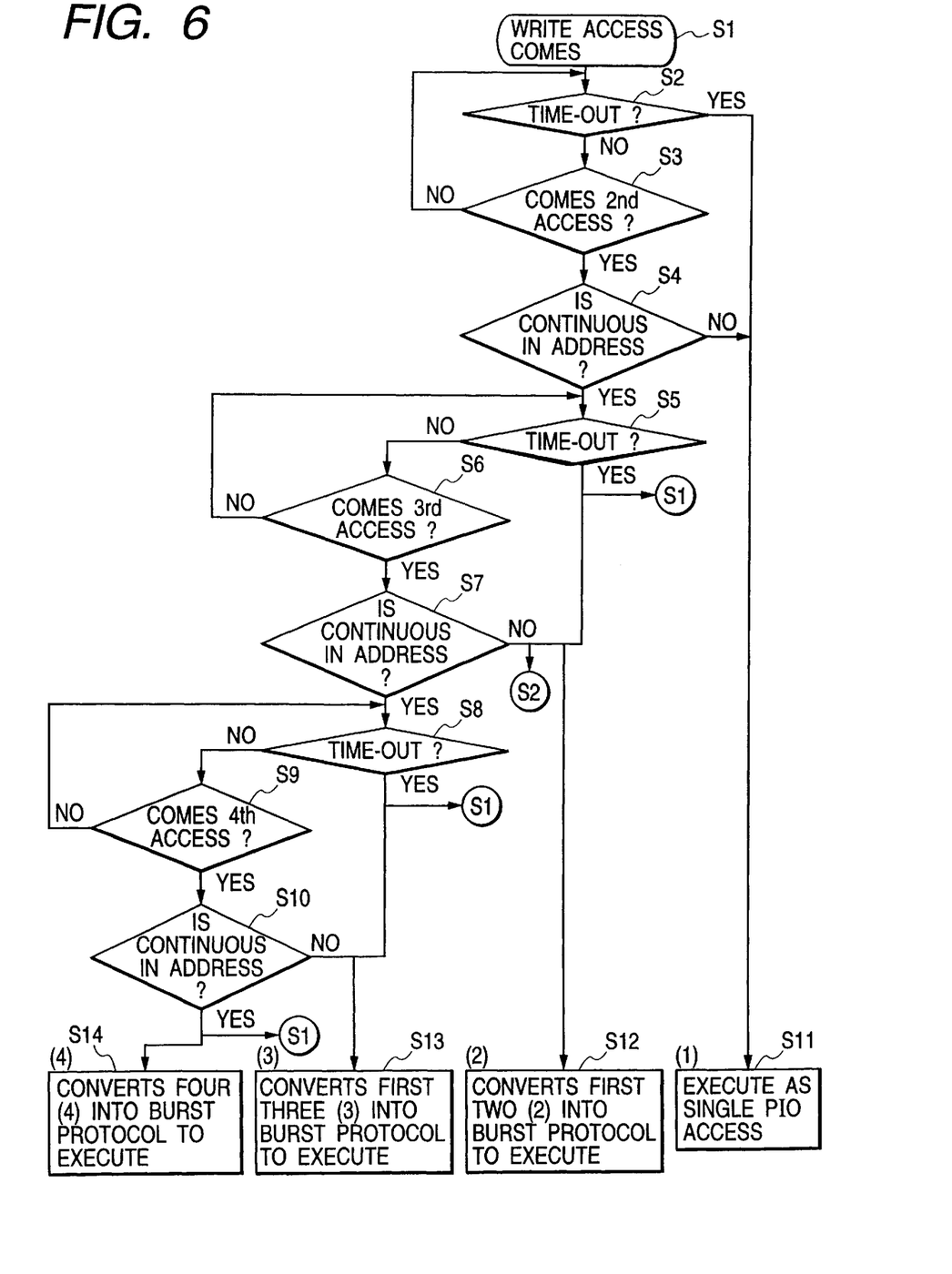
FIG. 6 is a flow chart for showing control processes in selection of data transfer methods of the micro-processor, according to the first embodiment of the present invention.
Figure 7A:
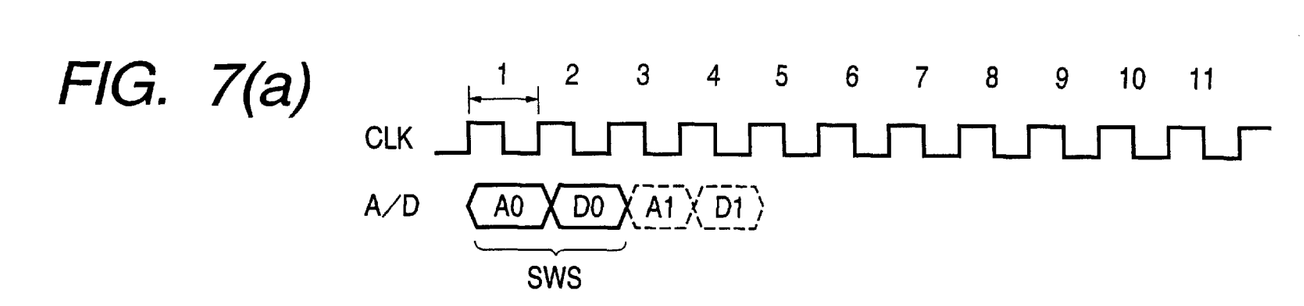
FIGS. 7a, 7b, 7c, 7d is a flow chart for showing control processes corresponding to the chart of FIG. 6.
Figure 7B:
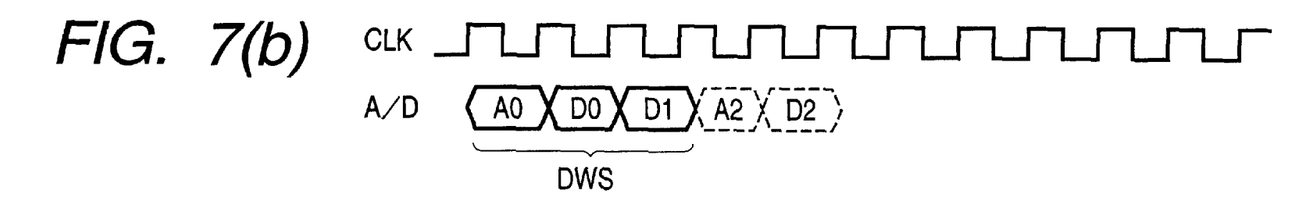
Figure 7C:
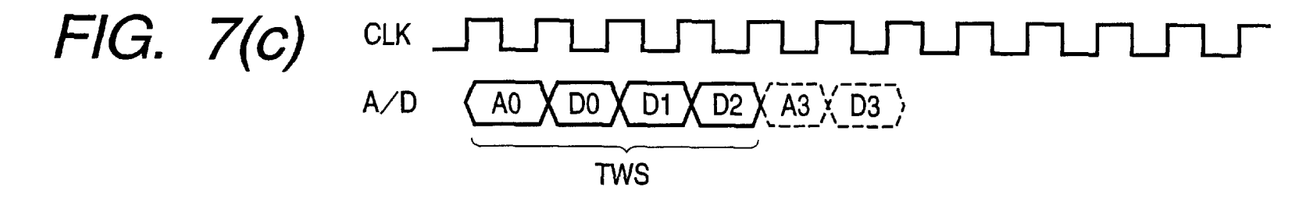
Figure 7D:
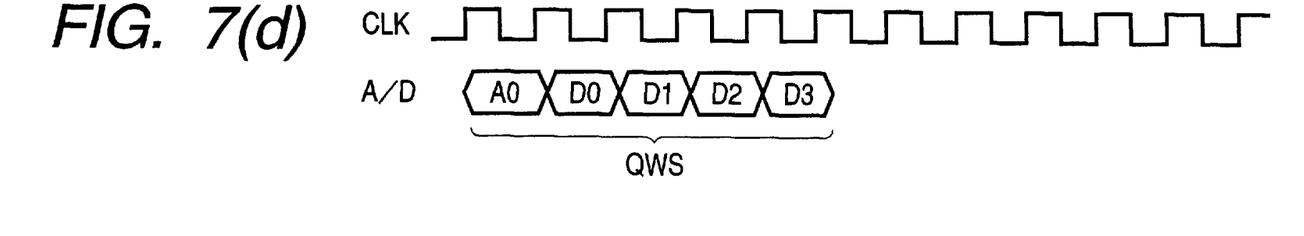

FIG. 6 shows the flow chart for showing control process of the micro-processor.

If there is the first PIO write access, an execution of a PIO access process is started (S1), and the timer is initiated (S2) so as to watch the arrival of the second access (S3). If there is no access within a predetermined time period, it is treated as the single PIO access, and the PIO address and the data thereof are transferred (S11).

If there is the second PIO access within the predetermined time period, the address comparator 37 determined there is the continuity in the addresses between it and the first access or not (S4). If there is no continuity in the addresses, the second PIO access is also treated as the single PIO access, and the PIO address and the data thereof are transferred (S11).

If there is the continuity, the timer is reset (S5) to watch the arrival of a third access (S6).

If there is no third access within the predetermined time period, the first two accesses are converted into the burst protocol, and the PIO addresses and the data thereof are transferred (S12).

If there is the third access within the predetermined time period, it is decided to be continuous with the second access in the addresses thereof (S7). Then, if it is not continuous with, the first two accesses are converted into the burst protocol, the PIO addresses and the data thereof are transferred (S12), and at the same time the process turns back to the step S1 so as to watch a next coming access.

When the addresses are continuous, the timer is reset (S8) so as to watch the arrival of a fourth access (S9).

If there is no fourth access within the predetermined time period, the first three accesses are converted into the burst protocol, and the PIO addresses and the data thereof are transferred (S13).

If there is the fourth access within the predetermined time period, it is decided to be continuous with the third access in the addresses thereof (S10). Then, if it is not continuous with, the first three accesses are converted into the burst protocol, the PIO addresses and the data thereof are transferred (S13), and at the same time the process turns back to the step S1 so as to watch the next coming access.

If the addresses are continuous with, the fourth access is converted into the burst protocol, and the PIO address and the data thereof are transferred (S14).

The transfer timing of the (step S11 (1)), the (step S12 (2)), the (step S13 (3)), and the (step S14 (4)) in FIG. 6 will be explained by referring to FIG. 7.

In FIG. 7, in particular FIG. 7 (*a*) shows the single PIO write access cycle SWS which is processed in the step S11, and FIG. 7 (*b*) shows the burst PIO write access cycle DWS of two data which is processed in the step S12.

FIG. 7 (*c*) shows the burst PIO write access cycle TWS of three data which is processed in the step S13, and FIG. 7 (*d*) shows the burst PIO write access cycle QWS of four data which is processed in the step S14.

Ordinarily, it is common that the CPU and the system bus are connected to each other through the bus converter 8 between the CPU and the system, however, in the first embodiment, such the processor 1 is adopted as shown in FIG. 2, which builds the system bus interface portion 30 therein, by taking the efficiency of data delivery into consideration. However, also an another chip can be also applicable to it, in which the system bus interface portion 30 is independent upon the processor 1.

Further, in the present first embodiment, though such the processor 1 having the built-in system bus interface portion 10 as shown in FIG. 2 is used, however, it is also possible to perform the same control if the CPU and the system bus is connected to each other through the bus converter.

Figure 8:
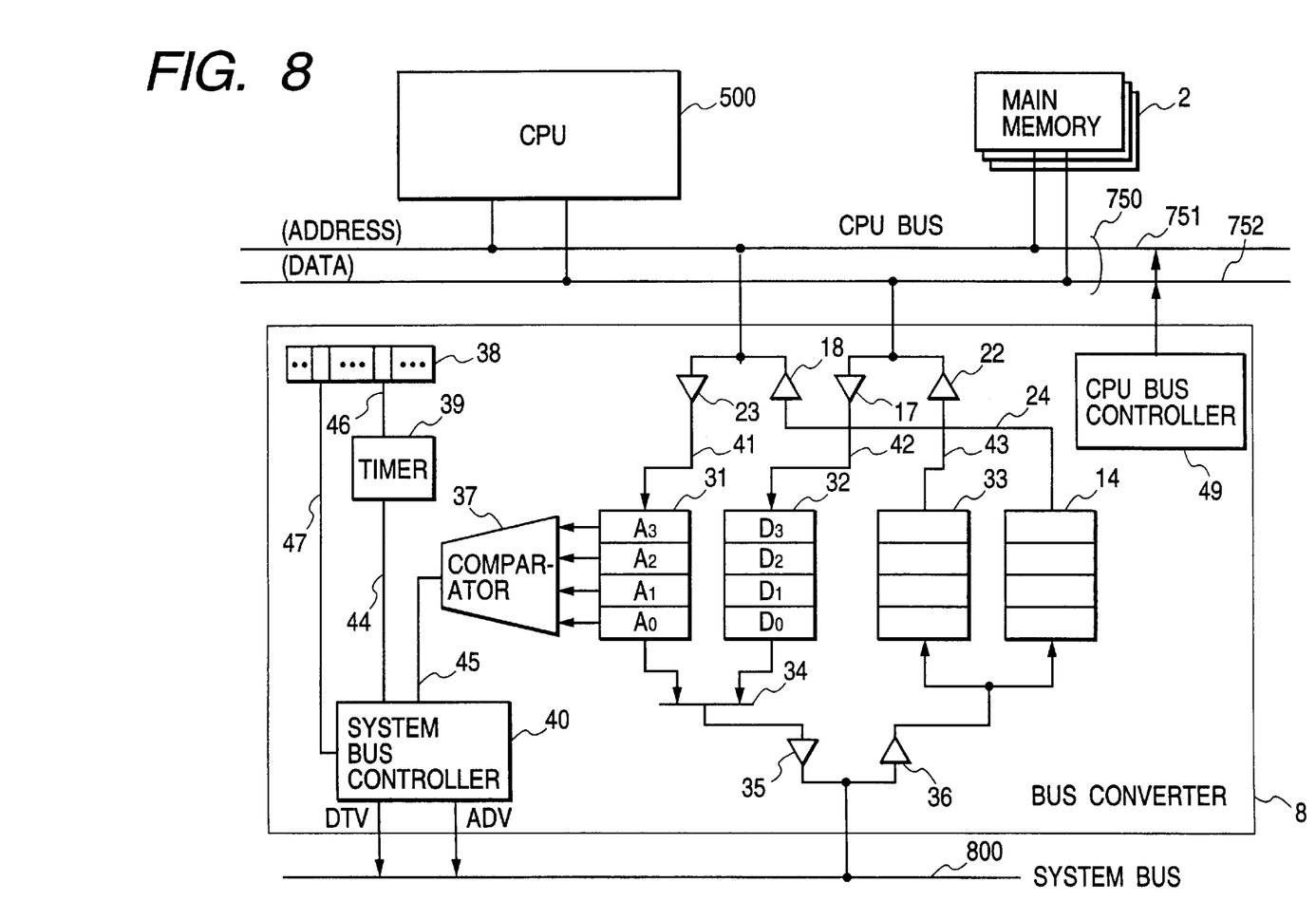
FIG. 8 is a block diagram for showing details of a system according to a second embodiment of the present invention and a bus converter used therein.

With referring to FIG. 8, an explanation will be given on a second embodiment according to the present invention. The second embodiment is for the bus converter in case of applying the CPU having only one system of the bus interface. In this embodiment, the bus converter 8 is connected to a CPU 500 and the main memory 2 through a CPU bus 750, and also to the system bus 800 as well.

The CPU 500 has the only one system of the bus interface.

The bus converter 8 executes the protocol conversion between the CPU bus 750 and the system bus 800.

The CPU bus 750 is constructed with an address line 751 and a data line 752.

The bus converter 8 is so constructed to have the address buffer 14 for main memory access, an input buffer 17, output buffers 18 and 22, an input buffer 23, an internal address line 24, an address buffer 33 for main memory access, a selector 34, an output buffer 35, an input buffer 36, an address comparator 37, a built-in control register 38, a timer 39, a system bus controller 40, an internal address line 41, an internal data line 42, an internal data line 43, a control line 45, 46 and 47 and a CPU bus 49.

The address comparator 37 decides whether the PIO addresses coming before and after about the time are those for the continuing addresses or not.

The timer 39 counts the distance between the PIO addresses coming on the heels of the other.

The system bus controller 40 controls the system bus accesses.

The CPU bus controller 49 also controls the system bus accesses.

The write access address from the CPU 500 is transferred to the address buffer 31 for PIO access through the CPU bus (address) 751, the input buffer 23 and the PIO access address line 41.

The write access data is transferred to the data buffer 32 for PIO write access through the CPU bus (data) 752, the input buffer 17 and the PIO and main memory write access data line 42.

The access address output of the address buffer 31 for PIO access and the data output of the data buffer 32 for PIO write access are sent out to the system bus 800 through the selector 34 and the output buffer 35, according to the processing of the present invention.

The PIO read data from the data buffer 33 for PIO read access is sent to the main memory 2 through the PIO read data lien 43, the output buffer 22 and the CPU bus (data) 752.

The output of the address buffer 14 for main memory access is outputted to the main memory 2 through the internal address line 24, the output buffer 18 and the CPU bus (address) 751.

The data for PIO read access which is inputted from the system bus 800 through the input buffer 36 is further inputted into the data buffer 33 for PIO read access, and the access address thereof is inputted into the address buffer 14 for main memory access.

The control line 44 transfers a control signal from the timer 39 to the system bus controller 40.

The control line 45 transfers a control signal from the address comparator 37 to the system bus controller 40.

The control line 46 transfers a control signal from the built-in-control register 38 to the timer 39.

The control line 47 transfers a control signal between the built-in control register 38 and the system bus controller 40.

The output of the address buffer 31 for PIO access is outputted to the address comparator 37.

The PIO access address and transfer method are carried out in the same manner as in the first embodiment.

According to this embodiment, even in a case of applying the CPU which has the only one system of bus interface, it is possible to connect between the CPU bus 750 and the system bus 800 through the bus converter 8, and it is also possible to execute change-over between the single PIO data transfer method and the burst PO data transfer method, for the cases where the addresses of the data to be transferred are not continuous or where they are continuous, automatically.

As is explained in the above, according to the present invention, the transfer requirements, coming from the bus of the other hierarchy through the bus converter 8 after the bus-conversion thereof, for example, the PIO accesses which are accessed to the system bus from the other processor through the bus converter, can be issued after being converted into the burst protocol transfer on the system bus when it is one for the continuous addresses, thereby enabling the improvement of the data efficiency on the bus.

What is claimed is:

1. A processor for an information processing equipment having an unit for executing calculation processes, comprising:

a buffer which stores plural sets of write addresses for a system bus of said information processing equipment and plural data corresponding to said write addresses;

a comparator for deciding whether write addresses in succession forming continuous write addresses exist in the write addresses stored in said buffer;

a timer for measuring a predetermined time period after receipt of one access; and converting means for converting respective accesses corresponding to writing operations of the plural data, corresponding to said continuous write addresses, into fixed length burst transfer protocol which can be transmitted with a series of continuing data cycles following one address cycle, when said continuous write addresses are detected by said comparator, wherein said comparator determines whether said one access and a predetermined number of other accesses are continuous in the address thereof, when receiving said predetermined number of other accesses within said predetermined time period measured by said timer, and wherein said converting means outputs said accesses corresponding to write addresses stored in said buffer by converting said accesses into the fixed length burst transfer protocol when said one access and said predetermined number of other accesses are continuous in the address thereof.

2. A processor for an information processing equipment, as defined in the claim 1, wherein said comparator decides whether the write addresses stored next to each other in said buffer are in succession or not.

3. A processor for an information processing equipment, as defined in the claim 1, wherein said plural write data is transferred from said system bus through a bus converter to a bus being different from said system bus.

4. A processor for an information processing equipment, as defined in the claim 1, further comprising means for initializing the transfer of write data with a delay of a predetermined time period, when there are detected the write addresses in succession within said write address buffer by said comparator.

5. A processor for an information processing equipment, as defined in the claim 1, further comprising means for setting up a value of said predetermined time period selectively.

6. A processor for an information processing equipment, as defined in the claim 1, wherein said processor is integrated on a single chip.

7. A processor for an information processing equipment, executing calculation processes, being connected with a multiplex bus with which address and data are used in time-sharing manner, comprising:

a write address buffer for storing plural write addresses which are transmitted with use of said multiplex bus;

a write data buffer for storing plural data which are transmitted with use of said multiplex bus;

a comparator for deciding whether there are continuous write addresses in the write addresses stored in said write buffer;

a timer for measuring a predetermined time period after receipt of one access; and converting means for converting accesses corresponding to writing operations of the plural write data stored in said write data buffer, corresponding to said continuous write addresses, into fixed length burst transfer protocol which can be transferred at a series of continuous data cycles following one address cycle, when said continuous write addresses are detected by said comparator, wherein said plural write data are transferred by the writing operations which are converted into said fixed length burst transfer protocol, wherein said comparator determines whether said one access and other accesses are continuous in the address thereof, when receiving said predetermined number of other accesses within said predetermined time period measured by said timer, and wherein said converting means outputs said accesses corresponding to write addresses stored in said buffer by converting said accesses into the fixed length burst transfer protocol when said one access and said predetermined number of other accesses are continuous in the address thereof.

8. A processor for an information processing equipment, as defined in the claims 7, wherein said comparator decides whether the write addresses stored next to each other in said buffer are in succession or not.

9. A processor for an information processing equipment, as defined in the claim 7, wherein said plural write data is transferred from said multiplex bus through a bus converter to a bus being different from said multiplex bus.

10. A processor for an information processing equipment, as defined in the claim 7, further comprising means for initializing the transfer of write data with a delay of a predetermined time period when there are detected the continuing write addresses within said write address buffer with said comparator.

11. A processor for an information processing equipment, as defined in the claim 10, further comprising means for setting up a value of said predetermined time period selectively.

12. A processor for an information processing equipment, as defined in claim 7, wherein said processor is integrated on a single chip.

13. A control method of a processor for an information processing equipment having a unit for executing calculation processes therein, wherein at least one of buses, being connected as an input/output means to an outside of said processor, is a multiplex bus with which address and data are used in a time-sharing manner, said control method comprising:

transferring by said processor data according to fixed length burst transfer protocol which can transfers data with a series of continuous data cycles following one address cycle;

storing in a write address buffer plural sets of write addresses for said bus, storing in a write data plural sets of write data for said bus;

deciding in a comparator whether access requirements, corresponding to write addresses, are continuous relative to each other in the write addresses thereof or not, within a predetermined time period after receipt of one access; and converting plural access requirements corresponding to write operations for the continuous write addresses into fixed length burst transfer protocol which can be transferred as a series of continuing data cycles following one address cycle, wherein when detecting the access requirements relative to each other, being continuous in the write addresses thereof within the predetermined time period after receipt of the one access, the plural write operations for said continuous write addresses is converted into the fixed length burst transfer protocol which can be transferred at the series of continuing data cycles following the one address cycle.

14. A processor for an information processing equipment, having an unit for executing calculation processes, comprising:

a buffer which stores plural sets of write addresses for a system bus of said information processing equipment and plural data corresponding to said write addresses;

a comparator for deciding whether there are write addresses in succession or not in the write addresses stored in said buffer;

a timer for measuring a predetermined time period after receipt of one access; and converting means for converting respective accesses corresponding to writing operations of the plural data, corresponding to said continuous write addresses in succession, into burst transfer protocol which can be transmitted with a series of continuing data cycles following one address cycle, when said continuous write addresses are detected by said comparator, wherein said comparator determines whether said one access and other access are continuous in the address thereof, when receiving said other access within said predetermined time period, wherein said converting means outputs said access corresponding to write addresses stored in said buffer by converting said accesses into the burst transfer protocol when said one access and said other access are continuous in the address thereof, wherein observation is made on whether a second access is made or not within said predetermined time period by initiating said timer, when a first access is made, wherein said first access is transmitted as a single access when said second access is not made within said predetermined time period, wherein determination is made on whether said first access and said second access are continuous or not in the write addresses thereof when said second access is made within said predetermined time period, wherein said first access is transmitted as a single access when said write addresses are not continuous, and wherein observation is made on presence of a third access within a predetermined time period by resetting said timer, and said first and second accesses are converted into the burst protocol, to be transmitted, when said third access is not made within said predetermined time period.

15. A processor for an information processing equipment, executing calculation processes, being connected with a multiplex bus with which address and data are used in time-sharing manner, comprising:

a write address buffer for storing plural write addresses which are transmitted with use of said multiplex bus;

a write data buffer for storing plural data which are transmitted with use of said multiplex bus;

a comparator for deciding whether there is continuity or not in the write addresses stored in said write buffer;

a timer for measuring a predetermined time period after receipt of one access; and converting means for converting accesses corresponding to writing operations of the plural write data stored in said write data buffer, corresponding to said write addresses detected to be continuous, into burst transfer protocol which can be transferred at a series of continuous data cycles following one address cycle, when the continuous write addresses are detected by said comparator, wherein said plural write data are transferred by the writing operations which are converted into said burst transfer protocol, wherein said comparator determines whether said one access and other access are continuous in the address thereof, when receiving said other access within said predetermined time period, wherein said converting means outputs said accesses corresponding to write addresses stored in said buffer by converting said accesses into the burst transfer protocol when said one access and said other access are continuous in the address thereof, wherein observation is made on whether a second access is made or not within said predetermined time period by initiating said timer, when a first access is made, wherein said first access is transmitted as a signal access when said second access is not made within said predetermined time period, wherein determination is made on whether said first access and said second access are continuous or not in the write addresses thereof when said second access is made within said predetermined time period, wherein said first access is transmitted as a single access when said write addresses are not continuous, and wherein observation is made on presence of a third access within a predetermined time period by resetting said timer, and said first and second accesses are converted into the fixed length burst protocol, to be transmitted, when said third access is not made within said predetermined time period.

* * * * *